United States Patent [19]

Yasuoka

[11] Patent Number: 4,697,568

[45] Date of Patent: Oct. 6, 1987

[54] FUEL INJECTION TIMING CONTROL METHOD FOR INTERNAL COMBUSTION ENGINES

[75] Inventor: Akimasa Yasuoka, Tokyo, Japan

[73] Assignee: Honda Giken Kogyo K.K., Tokyo, Japan

[21] Appl. No.: 826,069

[22] Filed: Feb. 4, 1986

[30] Foreign Application Priority Data

Feb. 8, 1985 [JP] Japan ............................ 60-21861

[51] Int. Cl.⁴ .............................................. F02D 41/34
[52] U.S. Cl. ..................................... 123/490; 123/478
[58] Field of Search ............... 123/478, 490, 480, 487; 364/431.05

[56] References Cited

U.S. PATENT DOCUMENTS

| | | | |
|---|---|---|---|
| 4,051,817 | 10/1977 | Hattori et al. ................... | 123/490 |
| 4,213,425 | 7/1980 | Read ............................. | 123/478 |
| 4,387,429 | 6/1983 | Yamauchi et al. ................. | 123/478 X |
| 4,478,190 | 10/1984 | Kawai ............................ | 123/478 |
| 4,541,388 | 9/1985 | Ujihashi et al. ................. | 123/490 X |

FOREIGN PATENT DOCUMENTS

| | | | |
|---|---|---|---|
| 113553 | 7/1984 | European Pat. Off. ............ | 123/478 |
| 148636 | 11/1981 | Japan . | |

*Primary Examiner*—Tony M. Argenbright
*Attorney, Agent, or Firm*—Arthur L. Lessler

[57] ABSTRACT

A fuel injection timing control method for an internal combustion engine, wherein fuel injection is effected over a fuel injection period determined based on engine operation parameters from predetermined fuel injection beginning relative to a predetermined crank angle position. The predetermined fuel injection beginning is corrected by a correction value obtained by multiplying the determined fuel injection period by a predetermined coefficient, to thereby determined desired fuel injection beginning. Preferably, the predetermined fuel injection beginning is corrected not only by the above correction value but by a second correction value based on the delay time that elapses from the moment fuel is injected until it is actually drawn into the engine cylinder.

6 Claims, 4 Drawing Figures

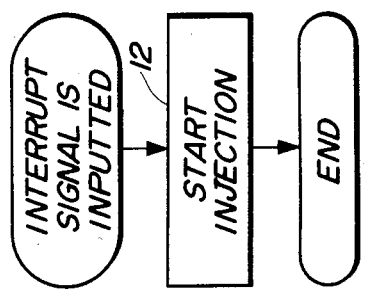
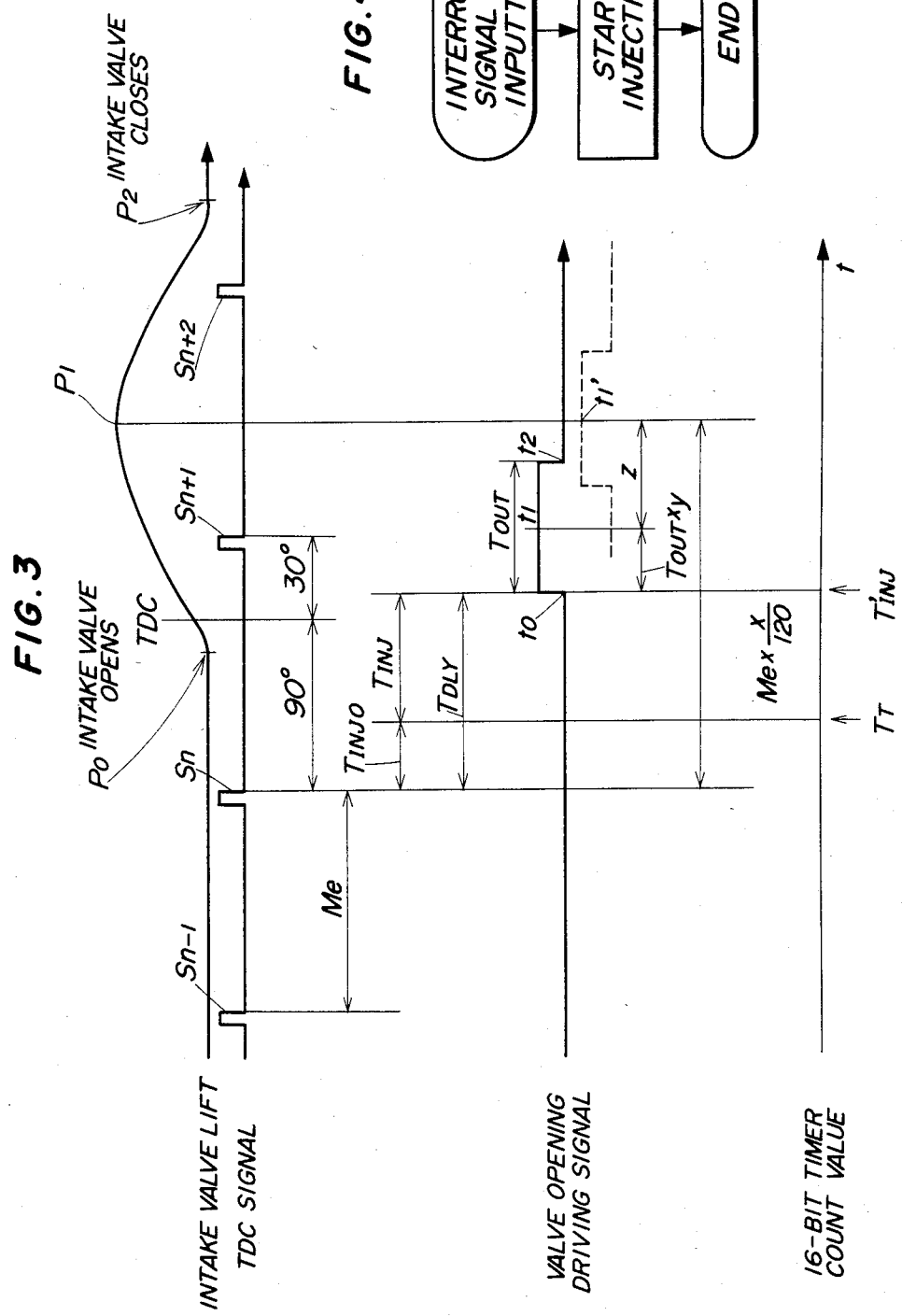

FUEL INJECTION TIMING CONTROL METHOD FOR INTERNAL COMBUSTION ENGINES

BACKGROUND OF THE INVENTION

This invention relates to a fuel injection timing control method for internal combustion engines, which is adapted to set the fuel injection timing to desired values.

A fuel injection timing control method for internal combustion engines has already been proposed in Japanese Provisional Patent Publication (Kokai) No. 56-148636, wherein the fuel injection timing is controlled in such a manner that the crank angle at which the fuel injection through the fuel injection valve is terminated is always maintained at a predetermined value slightly advanced from the crank angle at which the intake valve is closed, regardless of change in the engine rotational speed, to ensure positive ignition of the air-fuel mixture in the combustion chamber of the engine.

However, it has been empirically known that the optimal fuel injection timing differs depending on the specifications of the engine, such as the location of the fuel injection valves with respect to the intake valves, the configuration and size of the intake valves and their locations with respect to the fuel injection valves, and whether or not the engine is provided with sub-combustion chambers. Therefore, the conventional fuel injection timing control method has the disadvantage that, if fuel injection end is always maintained at a predetermined value as is the case with the conventional method, the engine cannot fully exhibit performance in respect of engine output, emission characteristics, fuel comsumption, etc, because the fuel injection timing determined by the fuel injection end maintained at the predetermined crank angle is not always optimal to the engine.

SUMMARY OF THE INVENTION

The object of the invention is to provide a fuel injection timing control method wherein the time at which fuel injection ends does not always correspond to a predetermined crank angle, as is done in the conventional method. Rather, the object of the invention is to provide such a method wherein the time at which fuel injection ends is controlled to correspond to a crank angle which enables the particular engine involved to exhibit optimal performance in respect of engine output, emission characteristics, fuel consumption, etc.; which method is capable of controlling the times at which fuel injection begins and ends to values optimal to various engines regardless of operating characteristics of the respective engines, by using a generalized program for controlling the fuel injection timing, with slight modification of the program for adaptation to each engine.

According to the present invention, there is provided a method of controlling the timing of fuel injection in an internal combustion engine having at least one cylinder, wherein a desired fuel injection period is determined based on operation parameters of the engine. Fuel injection is effected into said cylinder for the desired fuel injection period (TOUT) from a predetermined fuel injection beginning time corresponding to a predetermined crank angle position (Sn) immediately before the suction stroke of the cylider. The method employs the steps of: (a) detecting a value of at least one parameter (Me) representative of the rotational speed of said engine; (b) obtainig a first time period value by multiplying the detected value of the at least one parameter by a first coefficient (x); (c) obtaining a second time period value by multiplying the desired fuel injection period by a second coefficient (y), said first and second coefficients being set (in accordance with the type of engine) to values that enable fuel to be drawn into said cylinder at a desired timing; (d) determining elapsed time (TDLY) from said predetermined crank angle position on the basis of the difference between said first and second time period values; and (e) starting fuel injection from said predetermined fuel injection beginning ($t_0$) when the determined elapsed time elapses.

The above and other objects, features and advantages of the invention will be more apparent from the ensuing detailed description taken in conjunction with the accompanying drawings.

BRIEF DESCRIPTION OF THE DRAWINGS

FIG. 3 is a timing chart showing an embodiment of the fuel injection timing control according to the method of the invention; and FIG. 4 is a flowchart showing a program for starting the fuel injection, which is executed by intrrupt handling.

DETAILED DESCRIPTION

The invention will now be described in detail with reference to the drawings showing an embodiment thereof.

Figure 1:
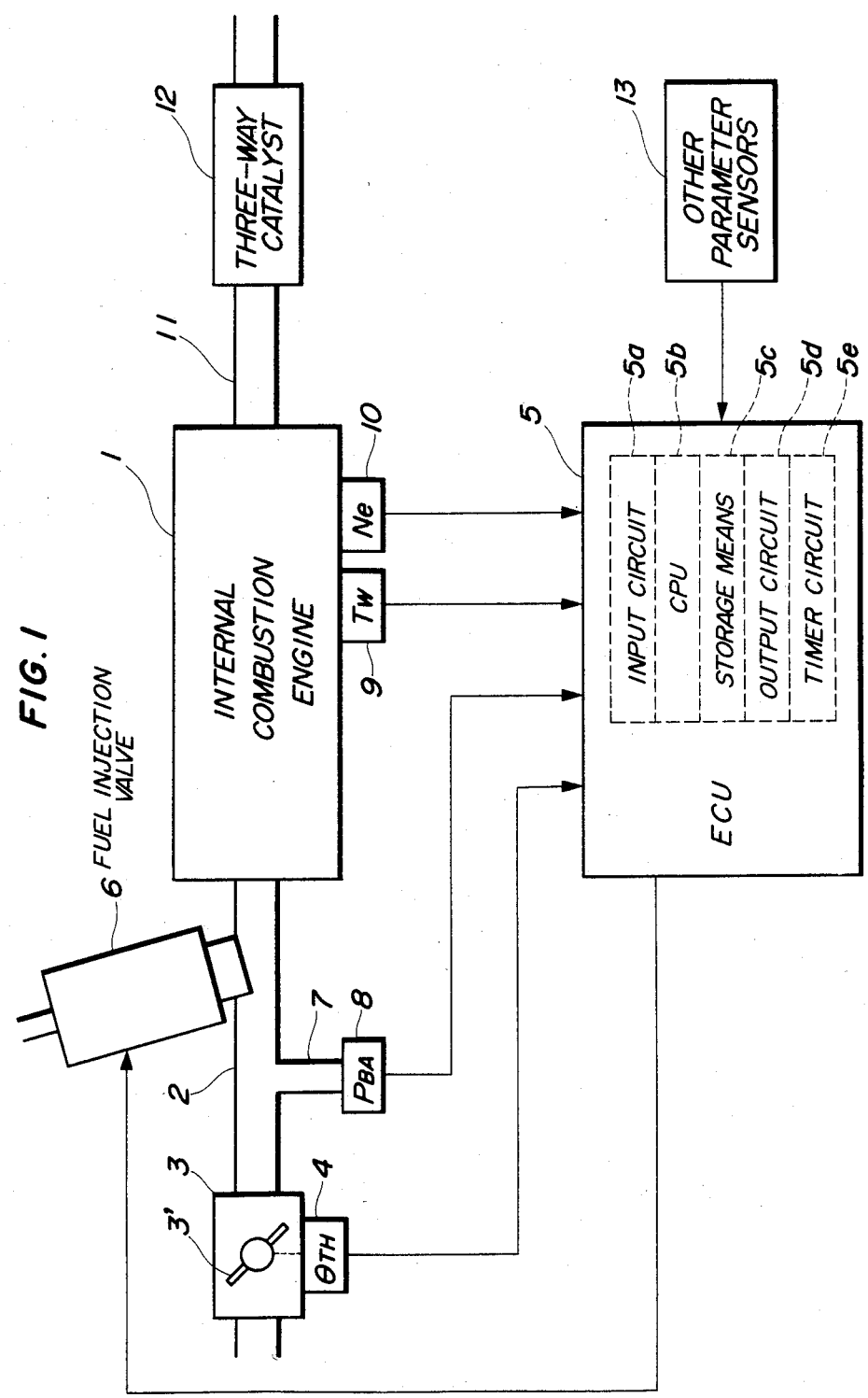
FIG. 1 is a block diagram of the whole arrangement of an internal combustion engine equipped with a fuel injection timing control system to which is applied the method of the invention.

Referring first to FIG. 1, there is illustrated the whole arrangement of an internal combustion engine equipped with a fuel injection timing control device to which the method of the present invention is applied. Reference numeral 1 designates an internal combustion engine having a plurality of, e.g. six, cylinders. An intake pipe 2 is connected to the engine 1, across which is arranged a throttle body 3 accommodating a throttle valve 3'. A throttle valve opening ($\theta$th) sensor 4 is connected to the throttle body 3 for detecting its valve opening and converting same into an electrical signal which is supplied to an electronic control unit (hereinafter called "ECU") 5.

Provided for each cylinder is a fuel injection valve 6, which is embedded in the intake pipe 2 at a predetermined location between the engine 1 and the throttle body 3 and in the vicinity of the respective intake valve (not shown). Each fuel injection valve 6 is connected to a fuel pump (not shown), and electrically to the ECU 5 in a manner having its valve opening period controlled by a signal supplied from the ECU 5.

On the other hand, an absolute pressure (PBA) sensor 8 communicates through a conduit 7 with the interior of the intake pipe 2 at a location immediately downstream of the throttle valve 3' of the throttle body 3, and is adapted to detect the absolute pressure in the intake pipe 2 and applies an electrical signal indicative of the detected absolute pressure to the ECU 5.

An engine temperature sensor (hereinafter called "TW sensor") 9, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rpm sensor (hereinafter called "Ne sensor") 10 is arranged in facing relation to a camshaft, not shown, for the engine 1 or a crankshaft, not shown, of same. The Ne sensor 10 is adapted to generate one pulse of a crank-angle-position signal (hereinafter called "TDC signal") at a particular crank angle each time the engine crankshaft rotates through 120 degrees, e.g. at a crank angle 90 degrees advanced from the top-dead-center (TDC), at which the suction stroke of the corresponding cylinder starts. The TDC signal is supplied to the ECU 5.

A three-way catalyst 12 is arranged across an exhaust pipe 11 of the engine 1 for purifying ingredients HC, CO and NOx contained in the exhaust gases.

Further connected to the ECU 5 are other parameter sensors 13 such as a battery voltage sensor for detecting battery voltage, an $O_2$ sensor for detecting oxygen concentration of the exhaust gases, and an atmospheric pressure sensor for detecting atmospheric pressure. These other parameter sensors 13 supply the ECU 5 with respective detected values.

The ECU 5 comprises an input circuit 5a having functions, among others, of shaping the waveforms of signals inputted from various sensors, shifting the voltage levels of other input signals to a predetermined level, and converting analog signal values into digital signal values, a central processing unit (hereinafter called "CPU") 5b, a storage means 5c for storing various calculation programs to be executed in the CPU 5b, the results of calculations, etc., an output circuit 5d with such functions as supplying the fuel injection valves 6 with driving signals to cause them to open in response to the results of calculations, and a timer circuit 5e. The output circuit 5d comprises a TOUT timer used for controlling the valve opening period of the fuel injection valves 6, and the timer circuit 5e at least comprises an Me timer used for measuring the time intervals between the generations of adjacent pulses of the TDC signal and the lapse of time from the generation of the present TDC signal pulse, and a 16-bit timer which is a ring counter capable of self-resetting and used for setting the time at which fuel injection is started.

Figure 2:
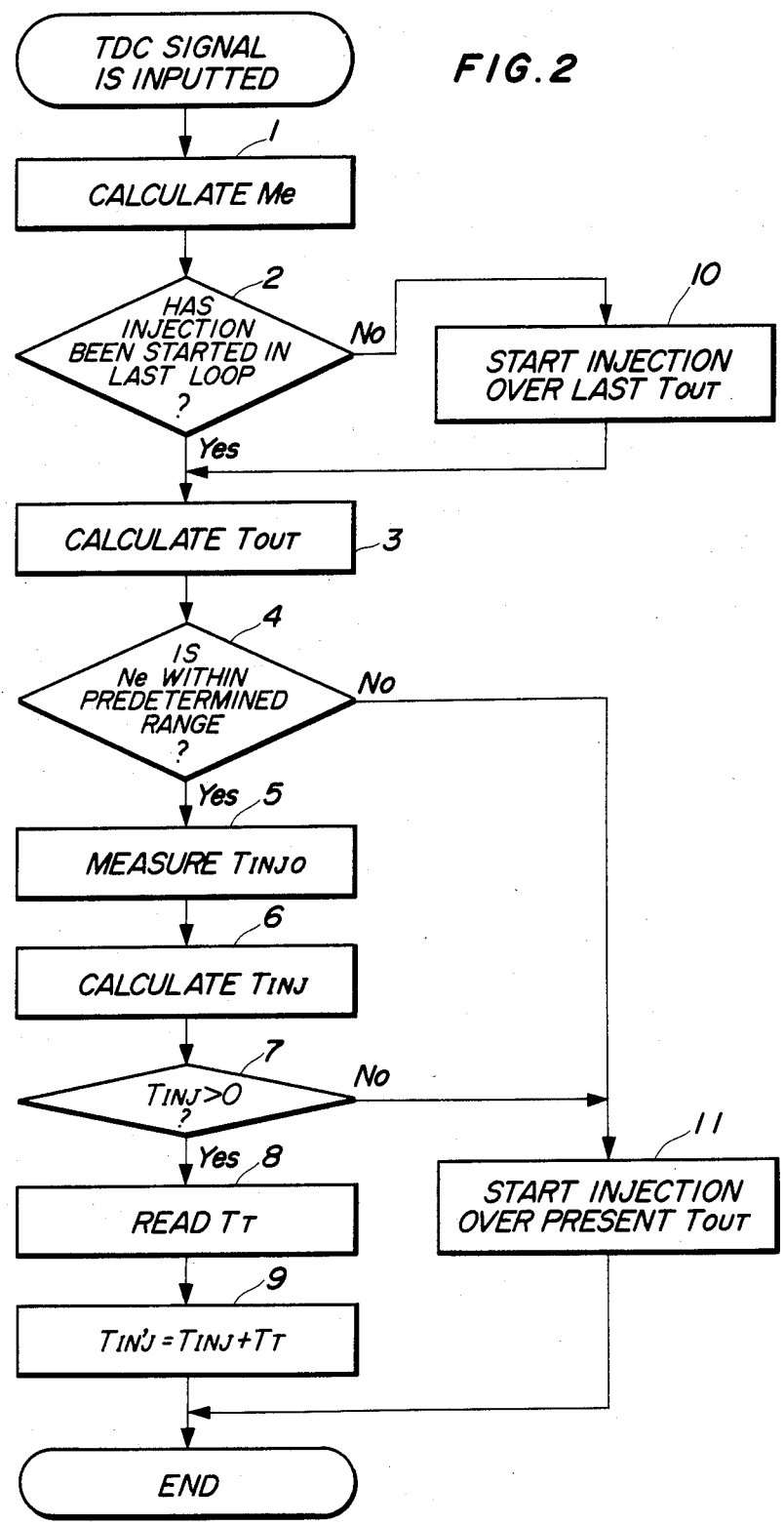
FIG. 2 is a flow chart showing the method of the invention.

Based on engine operation parameter signals inputted via the input circuit 5a from the various sensors, the CPU 5b calculates the fuel injection period and fuel injection beginning for the fuel injection valves 6 through the program of which the flowchart is shown in FIG. 2, which will be explained later, and then supplied the output circuit 5d with a control signal which controls the timing of opening and closing the fuel injection valves 6.

Next, the fuel injection timing control method according to the invention will be described in detail with reference to FIGS. 2 through 4.

FIG. 2 shows a program for executing the method of the invention and adapted such that the fuel injection valve 6 is controlled by the ECU 5 (FIG. 1), the program being executed each time a TDC signal pulse is generated by the Ne sensor 10.

When the present TDC signal pulse Sn is inputted from the Ne sensor 10 (FIG. 3), the Me timer calculates a coefficient value Me representing the time interval between the generations of the immediately preceding TDC signal pulse Sn−1 and the present TDC signal pulse Sn (step 1). This coefficient value Me is proportional to the reciprocal of the engine rotational speed Ne detected by the Ne sensor 10, and is expressed in a unit representing time length. Then at step 2 it is determined whether or not the fuel injection corresponding to the immediately preceding TDC signal pulse Sn−1 has been started. This determination is made depending on whether or not an interrupt signal has been generated after the 16-bit timer counted a set time TINJ, referred to later. If the answer to the question at step 2 is affirmative (Yes), the program proceeds to step 3.

At step 3, the fuel injection period for the fuel injection valves 6, namely valve opening period TOUT, is calculated through the following equation (1):

$$TOUT = Ti \times K1 + K2 \tag{1}$$

where Ti is a basic value of the valve opening period, which is determined as a function of the engine rotational speed Ne and the intake pipe absolute pressure PBA, and K1 and K2 are correction coefficients and correction variables, respectively, which have their values calculated by the use of respective predetermined equations on the basis of the values of engine opeeration parameter signals from various sensors such as the throttle valve opening sensor 4 and the Tw sensor 9 so as to optimize the operating characteristics of the engine such as fuel consumption and emission characteristics.

Next, at step 4 it is determined whether or not the engine rotational speed Ne is within a predetermined range (e.g. 400–3000 rpm). The ground for this determination is that there is a possibility that the time interval between TDC signal pulses, which varies with the engine rotational speed Ne, becomes shorter than the time (approx. 5.5 msec) required for completion of one cycle of the program operation when the engine rotational speed is high, that is, the operation of the program does not complete within the TDC pulse interval, which impedes attainment of the desired fuel injection timing. For instance, when the rotational speed Ne of an engine with six cylinders increases from 400 rpm to 4000 rpm, the TDC signal pulse interval decreases from 50 msec to 5 msec, which is shorter than the program operation time (approx. 5.5 msec), causing the above-mentioned inconvenience. Therefore, the upper limit of the predetermined range for the engine rotational speed Ne is set to a value, e.g. 3000 rpm, such that the TDC signal pulse interval becomes sufficiently greater than the program operation time (approx. 5.5 msec). Also, if a general 16-bit timer which is available today is used as the 16-bit timer in the timer circuit 5e, the timer can count only up to a short length of time, e.g. up to 52.4 msec in the case of the 16-bit timer used in this embodiment, since high clock pulses are used for operating the timer in order to enhance the counting accuracy per bit of the timer. When the time interval between TDC signal pulses exceeds 52.4 msec, the timer overflows to prevent the program from being executed. Therefore, the lower limit of the predetermined range for the engine rotational speed Ne is set to a value, e.g. 400 rpm, such that the TDC signal pulse interval does not exceed 52.4 msec, which is the longest measurable time length of the 16-bit timer.

Now, if the answer at step 4 is affirmative (Yes), that is, if the engine rotational speed Ne is determined to be within the predetermined range (e.g. 400–3000 rpm), the program proceeds to step 5, whereas if the answer is negative (No) the program proceeds to step 11, ex- (a) detecting the value of at least one parameter (Me) representative of the rotational speed of said engine;
(b) obtaining a first time period value by multiplying the detected value of the at least one parameter by a first coefficient (x);
(c) obtaining a second time period value by multiplying the desired fuel injection period by a second coefficient (y), said first and second coefficients being set in accordance with the type of the engine to values that enable fuel to be drawn into said cylinder at a desired timing;
(d) determining elapsed time (TDLY) from said predetermined crank angle position on the basis of the difference between said first and second time period values; and
(e) starting fuel injection from said predetermined fuel injection beginning time ($t_0$) when the determined elapsed time elapses.

2. A method as claimed in claim 1, wherein said first coefficient (x) is a value of the crank angle between said predetermined crank angle position (Sn) and a predetermined second crank angle position ($t_1'$) during the suction stroke at which the fuel injected at a predetermined time point ($t_1$) within said fuel injection period is drawn into said cylinder.

3. A method as claimed in claim 1, wherein said first coefficient is determined as a function of load on the engine.

4. A method as claimed in claim 1, wherein said first coefficient is determined as a function of temperature of the engine.

5. A method as claimed in claim 2, wherein said second coefficient (y) determines said predetermined time point ($t_1$).

6. A method as claimed in claim 1, which includes the steps of: obtaining a correction value (z) based on a delay time that elapses from the moment fuel is injected and until it is actually drawn into the cylinder, said correction value being determined in accordance with the type of the engine; and correcting said elapsed time by said correction value.

* * * * * plained later, to immediately start fuel injection to be continued for the valve opening period TOUT calculated at step 3.

At step 5, the Me timer in the timer circuit 5e measures the length of the time TINJO that has elapsed from the time of generation of the present TDC signal pulse (Sn), and then the program proceeds to step 6.

At step 6, the fuel injection start waiting time TINJ (FIG. 3), which is the time interval between the present time and the fuel injection starting time (injection beginning), is calculated through the following equation (2):

$$TINJ = TDLY - TINJO \quad (2)$$

where TINJO is the elapsed time measured at step 5, and TDLY is the desired time interval between the generation of the present TDC signal pulse (Sn) and the present fuel injection starting time $t_0$, which is given, in the case of a 6-cylinder engine, by the following equation (3):

$$TDLY = Me \times x/120 - TOUT \times y - z \quad (3)$$

where Me is the coefficient calculated at step 1, TOUT the valve opening period calculated at step 3, and x the angle through whcih the crankshaft rotates from the time of generation of the present TDC signal (Sn) to the time ($t_1'$ on the broken line in FIG. 3) at which the fuel injected at a predetermined time point (e.g. the middle point $t_1$ of the valve opening period TOUT), lying between the fuel injection starting time $t_0$ and the fuel injection terminating time (injection end) $t_2$, is drawn into the cylinder simultaneously as the crank assumes a predetermined angle position (e.g. the angle at which the intake valve lift assumes the maximum value, which occures at the time $P_1$). The value x may be set to a value of the angle between an optionally chosen crank angle position and the predetermined crank angle position at which the injected fuel is drawn into the cylinder, or it is also possible to read out a value for x from a map stored in the storage means 5c in response to engine loads such as the intake pipe absolute pressure (PBA) and the engine rotational speed (Ne), and the engine temperature (Tw). Incidentally, the first term on the right side of the equation (3) represents the time required for the crankshaft to rotate through the angle x.

The value y is a predetermined value which is variable from 0 to 1.0, to set the above-mentioned predetermined time point to a desired point. If y is set to zero, the predetermined time point coincides with the fuel injection starting time $t_0$; if y is set to 1.0, it coincides with the fuel injection termination time $t_2$; and if y is set to 0.5, it coincides with the fuel injection middle point $t_1$.

The value z is a predetermined value based on the travelling delay of the injected fuel to reach the engine cylinder from the fuel injection valve, and it is generally given as a function of the engine rotational speed Ne. However, z may also be set to a constant value such as an average value of empirical data of the travelling delay.

At step 7, it is determined whether or not the fuel injection start waiting time TINJ calculated at step 6 is greater than zero, and if the answer is affirmative (Yes) the program proceeds to step 8 to read the present time TT by the 16-bit timer in the timer circuit 5e. Then, at step 9 the fuel injection starting time T'INJ, to which the 16-bit timer is set, is calculated by the following equation (4) and the program terminates:

$$T'INJ = TINJ + TT \quad (4)$$

where TINJ is the fuel injection start waiting time calculated at step 6, and TT is the present time according to the 16-bit timer as read at step 8.

Now, if the answer to the question at step 7 is negative (No), that is, if the fuel injection start waiting time TINJ is equal to or less than zero, it means that fuel injection should have been already started, and therefore the program proceeds to step 11 to set the TOUT timer to the valve opening period TOUT obtained at step 3 of the present program and immediately start a fuel injection for a duration of the valve opening period TOUT, whereupon the program terminates.

Now, turning back to step 2, if the answer to the question there is negative (No), i.e., if, as of the moment of the execution of this step 2, fuel injection has not yet been started in response to the generation of the immediately preceding TDC signal pulse, the program proceeds to step 10 to start fuel injection over the valve opening period TOUT obtained at step 3 in the last loop, and then the program goes to step 3.

When the count value of the 16-bit timer becomes equal to the value T'INJ set at the step 9, an interrupt signal is generated from an interrupt signal generator circuit (not shown) and this signal causes the program of FIG. 4 to be executed. The FIG. 4 program sets the TOUT timer in the output circuit 5d to the valve opening period TOUT which was obtained at step 3 in the present loop, and immediately starts a fuel injection for a duration of the valve opening period TOUT (step 12), whereupon the program terminates.

Incidentally, the equation (3) is applied only in the case of 6-cylinder engine, and generally for an n-cylider engine the value TDLY is calculated through the following equation:

$$TDLY = Me \times 720/nx - TOUT \times y - z \quad (5)$$

Hence, in the case of a 4-cylinder engine the factor nx/720 becomes x/180.

Also, in this embodiment the value x is chosen such that the fuel injected at the middle point $t_1$ of the valve opening period TOUT is drawn into the cylinder simultaneously as the intake valve lift becomes maximum, which occurs at the time $P_1$. The value x, however, may be set to such a value that the fuel injected at the fuel injection starting time $t_0$ is drawn into the cylinder simultaneously as the intake valve starts opening at $P_0$, or the value x may be such that the fuel injected at the fuel injection terminating time $t_2$ is drawn into the cylinder immediately before the intake value is closed at $P_2$.

What is claimed is:

1. A method of controlling the timing of fuel injection in an internal combustion engine having at least one cylinder, wherein a desired fuel injection period is determined based on operation parameters of the engine, and fuel injection is effected into said cylinder for said desired fuel injection period (TOUT) from a predetermined fuel injection beginning time relative to a predetermined crank angle position (Sn) immediately before the suction stroke of the cylinder, the method comprising the steps of: